(12) United States Patent
Van Hoyweghen et al.

(10) Patent No.: US 9,771,444 B2
(45) Date of Patent: Sep. 26, 2017

(54) LOW CRYSTALLINE POLYMER COMPOSITIONS

(71) Applicant: ExxonMobil Chemical Patents Inc., Baytown, TX (US)

(72) Inventors: Danny Van Hoyweghen, Heverlee (BE); Cynthia A. Mitchell, Houston, TX (US); Achiel J. M. Van Loon, Antwerp (BE); Narayanaswami Dharmarajan, Houston, TX (US); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/295,154

(22) Filed: Oct. 17, 2016

(65) Prior Publication Data

US 2017/0174799 A1    Jun. 22, 2017

Related U.S. Application Data

(60) Provisional application No. 62/268,112, filed on Dec. 16, 2015.

(51) Int. Cl.
| | | |
|---|---|---|
| *C08F 210/06* | (2006.01) | |
| *C08F 210/02* | (2006.01) | |
| *C08J 5/18* | (2006.01) | |
| C08F 210/16 | (2006.01) | |
| C08F 110/02 | (2006.01) | |
| C08F 10/02 | (2006.01) | |
| B32B 27/32 | (2006.01) | |
| C08F 2/06 | (2006.01) | |

(52) U.S. Cl.
CPC ........... *C08F 210/02* (2013.01); *C08J 5/18* (2013.01); *B32B 27/32* (2013.01); *B32B 2323/04* (2013.01); *C08F 2/06* (2013.01); *C08F 10/02* (2013.01); *C08F 110/02* (2013.01); *C08F 210/06* (2013.01); *C08F 210/16* (2013.01); *C08F 2500/26* (2013.01); *C08J 2323/08* (2013.01)

(58) Field of Classification Search
None
See application file for complete search history.

(56) References Cited

U.S. PATENT DOCUMENTS

| | | |
|---|---|---|
| 5,747,592 A | 5/1998 | Huff et al. |
| 7,585,917 B2 | 9/2009 | Datta et al. |
| 8,618,033 B2 | 12/2013 | Kolb et al. |
| 2005/0215737 A1 | 9/2005 | Dharmarajan et al. |

FOREIGN PATENT DOCUMENTS

WO    2010/094450    8/2010

*Primary Examiner* — Richard A Huhn

(57) ABSTRACT

Provided herein is a polymer comprising greater than or equal to about 70 wt % units derived from ethylene, less than or equal to about 30 wt % units derived from propylene, and less than about 5 wt % of units derived from $C_4$-$C_{20}$ alpha-olefins, and having the following properties: crystallinity derived from ethylene; a heat of fusion of about 20 to about 85 J/g; a polydispersity index (Mw/Mn) of less than about 2.5; a reactivity ratio of about 0.5 to about 1.5; a proportion of inversely inserted propylene units based on 2, 1 insertion of propylene monomer in all propylene insertions, as measured by $^{13}C$ NMR of less than 0.5 wt %; and a branching index greater than about 0.5

12 Claims, No Drawings

LOW CRYSTALLINE POLYMER COMPOSITIONS

PRIORITY

This invention claims priority to and the benefit of U.S. Patent Application Ser. No. 62/268,112, filed Dec. 16, 2015, which is herein incorporated by reference.

FIELD OF THE INVENTION

This application relates to polymer compositions and processes for making thereof.

BACKGROUND OF THE INVENTION

The present invention relates to low crystalline polymer compositions and processes for making compositions. Polymer compositions having a desirable balance of properties and attributes, leading to enhanced compositions that are useful in a number of applications, are generally sought. Such composition enhancements can manifest themselves in a variety of ways depending on the specific application and the specific blend contemplated. Such enhancements include, but are not limited to: (1) processibility in the molten state in such processes as milling, extrusion, calendering and injection molding; (2) initial physical properties in a solid state such as toughness, tack, adhesion, tear resistance, toughness, sealing, tensile and elongation; (3) improvements in the above-mentioned properties; and (4) long-term maintenance of such physical properties. A variety of approaches have been suggested to obtain polymer compositions with the desired properties and attributes, but those approaches have experienced various shortcomings.

U.S. Pat. No. 5,747,592 discloses a thermoplastic composition with polypropylene, rubber, and a plastomer. U.S. Pat. No. 8,618,033 discloses an ethylene copolymer with 40-70 wt % of units derived from ethylene and at least 30 wt % of units derived from at least one a-olefin having 3 to 20 carbons. U.S. Pat. No. 7,585,917 discloses a process for making thermoplastic blend compositions having a physical blend of a first polymer component, having polypropylene, and a second polymer component, having a reactor blend of a propylene polymer and an ethylene alpha-olefin elastomer.

There is still a need for a single reactor polymer composition that provides suitable properties for film applications, including tear resistance and toughness as compared to compositions currently available.

SUMMARY OF THE INVENTION

Provided herein is a polymer comprising greater than or equal to about 70 wt % units derived from ethylene, less than or equal to about 30 wt % units derived from propylene, and less than about 5 wt % of units derived from $C_4$-$C_{20}$ alpha-olefins, and having the following properties: crystallinity derived from ethylene; a heat of fusion of about 20 to about 85 J/g; a polydispersity index (Mw/Mn) of less than about 2.5; a reactivity ratio of about 0.5 to about 1.5; a proportion of inversely inserted propylene units based on 2, 1 insertion of propylene monomer in all propylene insertions, as measured by $^{13}C$ NMR of less than 0.5 wt %; and a branching index greater than about 0.5.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

Various terms as used herein are defined below. To the extent a term used in a claim is not defined below, it should be given the broadest definition persons in the pertinent art have given that term as reflected in at least one printed publication (e.g., a dictionary or article), issued patent or published application.

Continuous. When used to describe a process or an aspect of a process, e.g., a process step, the term "continuous" and its derivatives, including "continuously," shall cover any process or step in which reagents and reacted products are supplied and removed continuously so that steady state, stable reaction conditions can be achieved.

Polymer. Except as required by the particular context, the term "polymer" used herein is the product produced by particular continuous polymerization in a particular polymerization zone or reactor.

Polymerization. As used herein, the term "polymerization" to be given the broadest meaning used by persons skilled in the art refers to the conversion of monomer into polymer. Polymerization zone refers to the zone in which polymerization takes place and is generally formed by a back mixed reactor for forming a substantially random polymer.

Melting Point, Heat of Fusion and Crystallization. The polymers and compositions described herein can be characterized in terms of their melting points and heats of fusion, which properties can be influenced by the presence of comonomers or steric impurities that hinder the formation of crystallites by the polymer chains. Samples may be tested in the form of powders, granules, pellet, film, sheet and molded specimens. Using the DSC $2^{nd}$ melt experiments, the values of the melting point (Tm) and the heat of fusion ($H_f$) were obtained. Measurements were performed on a Perkin Elmer Pyris 1 Differential Scanning calorimeter. The melting temperature, Tm, of the polymers and compositions were measured using a Perkin Elmer Pyris 1 DSC equipped with an autosampler. An indium standard is run prior to the first use on a given day to check the instrument's performance. Typically, 5-10 mg of sample was sealed in an aluminum pan with hermetic lid and loaded into the instrument. In a nitrogen environment, the sample was first cooled to −40° C. and held for 10 minutes. The sample was heated to 200° C. at 10° C./minute and melting data (first heat) were acquired. This provides information on the melting behavior under "as received" conditions, which can be influenced by thermal history as well as sample preparation method. The sample was then held at 200° C. for 10 minutes to ensure erasure of thermal history. Crystallization data (first cool) were acquired by cooling the sample from the melt to −40° C. The sample was held at −40° C. for 10 minutes and then the second heat was acquired by heating the sample to 200° C. at 10° C./minute. The melting point is recorded as the temperature of the greatest heat absorption within range of melting of the sample. The endothermic melting transition was analyzed for peak temperature as Tm and for area under the peak as heat of fusion ($H_f$).

Comonomer Content. The comonomer content of the polymer is measured using 13C nuclear magnetic resonance (NMR). The 13C solution NMR was performed on a 10 mm broadband probe at a field of at least 600 MHz in tetrachloroethane-d2 solvent at 120° C. with a flip angle of 90° and full NOE with decoupling. Sample preparation (polymer dissolution) was performed at 140° C. where 0.20 grams of polymer was dissolved in an appropriate amount of solvent to give a final polymer solution volume of 3 mL. Chemical shifts were referenced by setting the most intense propylene methyl group signal to 21.83 ppm. The composition calculations of the ethylene propylene copolymer are described by Randall in "A Review Of High Resolution Liquid 13Carbon Nuclear Magnetic Resonance Characterization of Ethylene-Based Polymers", Polymer Reviews, 29:2, pp. 201-317 (1989).

Molecular Weight Characteristics. Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and $\lambda$=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{k M_v^\alpha}$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $M_i^2$.

All molecular weights are weight average unless otherwise noted. All molecular weights are reported in g/mol unless otherwise noted. Branching Index. The ethylene elastomers described herein preferably having a branching index of greater than about 0.5. The relative degree of branching in the ethylene, alpha-olefin is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, 2nd edition (1986). These are: (i) Mw, GPC LALLS, weight average molecular weight measured using a low angle laser light scattering (LALLS) technique in combination with Gel Permeation Chromatography (GPC) (ii) weight average molecular weight (Mw-DRI) and viscosity average molecular weight (MvDRI) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

An average branching index (i.e., branching index as used herein) is defined as: BI=Mv, br×Mw, DRI Mw, GPC LALLS×Mv, GPC DRI where, Mv,br=(IV/k)1/a; and "a" is the Mark-Houwink constant (=0.759 for ethylene, propylene diene elastomeric polymers in decalin at 135° C.). From equation (1) it follows that the branching index for a linear polymer is 1.0. For branched polymers, the extent of branching is defined relative to the linear polymer. Since at a constant number average molecular weight Mn, (MW)branch>(MW)linear, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, "k" and "a" values appropriate for the GPC solvent should be used in the equation above.

Mooney Viscosity. The term "Mooney Viscosity" a term used to characterize certain polymers, polymer components, and polymer compositions herein. As used herein, the term Mooney Viscosity (ML (1+4) at 125° C.) or simply "Mooney Viscosity," to be defined and measured according to the definition and measurement procedure set forth in U.S. Pat. No. 6,686,415, which is hereby incorporated by reference in its entirety. Alternatively, any "Mooney Viscosity" value referenced herein (including those in the claims) is deemed to encompass any Mooney Viscosity measured in accordance with any recognized, published procedure for measuring Mooney Viscosity.

MI. The term "MI" used herein stands for "Melt Index". The units for "MI" are grams per 10 minutes and the test to be herein for determining MFR/MI is set forth in any version and condition set forth in ASTM-1238 that uses 2.16 kg at 190° C.

Branching Index. The ethylene polymers described herein preferably having a branching index of greater than about 0.5. The relative degree of branching in the ethylene, alpha-olefin polymer is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, $2^{nd}$ edition (1986). These are: (i) $M_{w,\ GPC\ LALLS}$, weight average molecular weight measured using a low angle laser light scattering (LALLS) technique in combination with Gel Permeation Chromatography (GPC); (ii) weight average molecular weight ($Mw_{DRI}$) and viscosity average molecular weight ($Mv_{DRI}$) using a differential refractive index (DRI) detector in combination with GPC; and (iii) intrinsic viscosity (IV) measured in decalin at 135° C. The first two measurements (i and ii) are obtained in a GPC using a filtered dilute solution of the polymer in trichlorobenzene.

An average branching index (i.e., branching index as used herein) is defined as: BI=Mv, br×Mw, DRI Mw, GPC LALLS×Mv, GPC DRI where, $M_{v,br}=(IV/k)^{1/a}$; and "a" is the Mark-Houwink constant (=0.759 for ethylene, propylene diene elastomeric polymers in decalin at 135° C.). From equation (1) it follows that the branching index for a linear polymer is 1.0. For branched polymers, the extent of branching is defined relative to the linear polymer. Since at a constant number average molecular weight $M_n$, $(M_W)_{branch}>(M_W)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, "k" and "a" values appropriate for the GPC solvent should be used in the equation above.

Reactivity Ratio. Preferably, the ethylene polymers have a reactivity ratio of between 0.5 to 1.5. The reactivity ratio product is described more fully in Textbook of Polymer Chemistry, F. W. Billmeyer, Jr., Interscience Publishers, New York, p. 221 et seq. (1957). The reactivity ratio product $r\hat{}$, where i is the reactivity of ethylene and $r_2$ is the reactivity of propylene, can be calculated from the measured diad distribution (PP, EE, EP and PE in this nomenclature) by the application of the following formulae: $nr_2=4$ (EE)(PP)/(EP)$^2$ $r_1=K_{11}/K_{12}=[2(EE)/EP]X$ $r_2=K_{22}/K_{21}=[2(PP)/(EP)]X$. P=(PP)+(EP/2) E=(EE)+(EP/2) where Mol % E=[(E)/(E+P)]*100. X=E/P in reactor; Kπ and $K_{12}$ are kinetic insertion constants for ethylene; and $K_{21}$ and $K_{22}$ are kinetic insertion constants for propylene.

As is known to those skilled in the art, a reactivity ratio product $r\hat{}$ of 0 can define an "alternating" copolymer, and a reactivity ratio product of 1 is said to define a "statistically random" copolymer. In other words, a copolymer having a reactivity ratio product $r\hat{}$ of between 0.6 and 1.5 is generally said to be random (in strict theoretical terms, generally only a copolymer having a reactivity product t\Xt greater than 1.5 contains relatively long homopolymer sequences and is said to be "blocky"). The polymer of the invention will have a reactivity ratio product $r\hat{}_2$ of less than 1.5, or less than 1.3, or less than 1.0, or less than 0.8, and greater than 0.5. The substantially uniform distribution of comonomer within polymer chains of embodiments of our invention generally precludes the possibility of significant amounts of propylene units or sequences within the polymer chain for the molecular weights (weight average) disclosed herein.

Proportion of inversely inserted propylene units based on 2,1 insertion. Preferably, the ethylene polymers have a proportion of inversely inserted propylene units based on 2,1 insertion of less than 0.5 wt %. The proportion of the 2,1-insertions to all of the propylene insertions in a propylene polymer was calculated by the following formula with reference to article in the journal Polymer, Vol. 30 (1989), p. 1350.

Proportion of inversely inserted unit based on 2,1 insertion $$(\%) = \frac{0.25I\alpha\beta(\text{structure}(i)) + 0.5I\alpha\beta(\text{structure}(ii))}{I\alpha\alpha + I\alpha\beta(\text{structure}(ii)) + 0.5(I\alpha\gamma + I\alpha\beta(\text{structure}(i)) + I\alpha\delta)} \times 100$$

Naming of the peaks in the above formula was made in accordance with a method by Carman, et al. in the journal Rubber Chemistry and Technology, volume 44 (1971), p. 781, where $I_{\alpha\delta}$ denotes a peak area of the $\alpha\delta^+$ secondary carbon peak. It is difficult to separate the peak area of $i\alpha\beta$ (structure (i)) from iαβ (structure (ii)) because of overlapping of the peaks. Carbon peaks having the corresponding areas can be substituted therefor.

One or more of the compositions described herein, the ethylene polymer is present in the composition in an amount of more than 50 wt % based on the total weight of the polymer composition.

One or more of the compositions described herein, further comprises a filler, or a plasticizer, or both.

In one or more of the compositions described herein, the polymer composition is substantially free from a unit derived from a diene.

In one or more of the compositions described herein, the ethylene polymer is a low crystalline ethylene propylene copolymer.

Ethylene Polymer

The polymers described herein are predominantly ethylene, i.e., having more than 70 wt % units derived from ethylene monomer. In one or more of the compositions described herein, the ethylene content of the ethylene polymer is greater than or equal to about 70 wt %, preferably greater than about 75 wt %, or 77 wt % to less than about 85 wt % or about 90 wt %. In an embodiment, the ethylene polymer has a propylene content of less than about 30 wt %, preferably 25%, or 23 wt % to greater than about 15 wt % or about 10 wt %. In an embodiment, the ethylene polymer has a $C_4$-$C_{20}$ alpha-olefin content of less than about 5 wt %.

Preferably, the polymer (also referred to as the "ethylene polymer") has some crystalline (including "semi-crystalline"), also referred to herein as "crystallinity derived from ethylene." But any crystallinity of the polymer is preferably derived from the ethylene. The percent crystallinity in such cases is measured as a percentage of polyethylene crystallinity and thus the origin of the crystallinity from ethylene is established.

Preferably, in addition to units derived from ethylene, the polymer also includes units derived from an .alpha.-olefin monomer. Suitable alpha.-olefin monomers include, but are not limited to propylene, butene, pentene, hexene, heptene, or octene, and their isomers. Advantageously, the polymer can be formulated using different .alpha.-olefin monomers, selected from the list above, and/or different amounts of monomers, e.g., ethylene and .alpha.-olefin monomers, to prepare different types of polymers, e.g., ethylene polymers having desired properties.

Preferably, the polymer includes (or is) a polymer, which is preferably an ethylene polymer (including ethylene-cyclic olefin and ethylene-.alpha.-olefin-diolefin) having high molecular weight (as measured by Mooney Viscosity) and low crystallinity. The polymer can be prepared utilizing any appropriate catalyst, but preferably the catalyst described below. Any number of polymers having a selected composition (e.g., monomer type and content) and properties can be formed.

Polymerization Process

Disclosed herein is a process for making a polymer composition that comprises an ethylene polymer, the process comprising: polymerizing in a polymerization zone in a solvent a combined feed of a monomer system and a catalyst system to provide a mixture that includes the ethylene polymer, said ethylene polymer preferably being a random copolymer of ethylene and propylene derived units, wherein the ethylene polymer is either noncrystalline or has ethylene-type crystallinity.

Polymerization Catalysts

In a broadest form, the compositions can be prepared using any SSC (single sited catalyst). Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such a cyclopentadienyl type ring structure. The ancillary ligand may also be a pyridinyl or amide ligand. The transition metal is preferably of Group 4 of the Periodic table such as titanium, hafnium or zirconium which are used in polymerization in the d.sup.0 mono-valent cationic state and have one or two ancillary ligands as described in more detail hereafter. The important features of such catalysts for coordination polymerization are the ligand capable of abstraction and that ligand into which the ethylene (olefinic) group can be inserted.

The transition metal complex may impose a degree of steric order on the propylene monomer by suitable chirality. Where first polymers of higher molecular weight are desired or higher polymerization temperatures, it is preferable to a non- or weakly coordinated anion (the term non-coordinating anion as used herein includes weakly coordinated anions) as cocatalyst. Alternatively aluminoxanes or complexes incorporating oxy-aluminum moieties may be used.

A precursor for the non-coordinating anion may be used with a transition metal complex supplied in a reduced valency state. The precursor may undergo a redox reaction. The precursor may be neutral, such as a borane complex and form the transition metal cation by abstracting a ligand from it. The precursor may be an ion pair of which the precursor cation, such as a borate, is neutralized and/or eliminated in some manner. The precursor cation may be an ammonium salt as in EP277003 and EP277004. The precursor cation may be a triphenyl carbonium derivative as in EP426637. The non-coordinating anion can be a Group 10-14 complex wherein boron or aluminum is the charge bearing atom shielded by ligands which may be halogenated and especially perfluorinated. Preferably, tetra-aryl-substituted Group 10-14 non-carbon element-based anion, especially those that are have fluorine groups substituted for hydrogen atoms on the aryl groups, or on alkyl substituents on those aryl groups.

The non-coordinating anion may be used in approximately equimolar amounts relative to the transition metal complex, such as at least 0.25, preferably 0.5, and especially 0.8 and such as no more than 4, preferably 2 and especially 1.5.

The transition metal complex may be a pyridine amine complex useful for olefin polymerization such as those described in WO 03/040201. The transition metal complex may a fluxional complex which undergoes periodic intramolecular re-arrangement so as to provide the desired interruption of stereoregularity as in U.S. Pat. No. 6,559,262. The transition metal complex may be a stereorigid complex with mixed influence on propylene insertion, see EP1070087.

Preferably the transition metal complex is a chiral bridged bis cyclopentadienyl derivative having the formula $L^A L^B L_i^C MDE$ where $L^A$ and $L^B$ are substituted or unsubstituted cyclopentadienyl or hetero-cyclopentadienyl ancillary ligand .pi.-bonded to M in which the $L^A$ and $L^B$ ligands are covalently bridged together through a Group 14 element linking group; $L_i^C$ is an optional neutral, non-oxidizing ligand having a dative bond to M (i equals 0 to 3); M is a Group 4 or 5 transition metal; and, D and E are independently mono-anionic labile ligands, each having a .sigma.-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from −0° C. to 200° C. for a time of from 1 second to 10 hours.

In certain embodiments, the ethylene polymer of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce polypropylene with an Mn of up to 4 million. See Sassmannshausen, Bochmann, Rosch, Lilge, J. Organomet. Chem. (1997) 548, pp. 23-28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis (dimethylsilyl) zirconium dichloride and MAO; International Patent Publication No. WO98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non- or weakly coordinating anion activators (NCA) derived and generated in any of the ways amply described in published patent art such as EP277004, EP426637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g., trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

Specific Catalysts

During the polymerization process described above, the appropriate catalyst may be delivered to the reactor in a variety of ways. For example, it may be delivered as a solution or slurry activated in-line just prior to the reactor, or preactivated and pumped as an activated solution or slurry to the reactor. Polymerization is carried out in a reactor, in which reactant components (e.g., desired monomers, comonomers, catalyst/activators, scavengers, and optional modifiers) are preferably added continuously to the reactor.

In an embodiment, a catalyst mixture comprising one or more catalysts may be present in the single reactor used to prepare the ethylene polymer.

In certain embodiments of the processes and compositions, catalysts described in U.S. Pat. No. 6,207,756 can be used in the polymerization process, and that patent is hereby incorporated by reference in its entirety, particularly the portions describing the catalyst, e.g., column 8 line 20 through column 14, line 21. Preferred catalysts are those that are isospecific. The catalyst is preferably 1, 1'-bis(4-triethylsilylphenyl)methylene-(cyclopentadienyl)(3,8-di-tertiary-butyl-1-fluroenyl)hafnium dimethyl with dimethylaninliniumtetrakis(pentafluorophenyl)borate activator.

Preferred Procedures for Making Polymer Compositions

The following methods can be followed in the production of the polymer compositions of the invention. Such materials have unique properties because they are not subjected to shear degradation in melt processing equipment.

The ethylene polymer which is richer in ethylene, preferably contains about 50 to 90% ethylene, and more preferably containing 50 to 75% ethylene; is made with a metallocene catalyst in a suitable polymerization reactor vessel.

In certain methods, the monomers (also called reactants) are dissolved in a hydrocarbon solvent. The hydrocarbon solvent may be one of the monomers or may be an inert solvent. In the preferred method, a solvent, such as pentane, hexane, heptane, octane, or other paraffins, are employed. The solvents may be used in combination or singly. In some instances, cycloalkanes, or aromatic solvents, such as toluene, may also be used. Such solvents are often selected because they provide a better medium in which to dissolve the catalyst. It is also possible to use mixtures of different types of solvents.

Such processes where the reactions are carried out in a solvent are referred to herein as solution processes. Solution processes provide improved heat transfer and reduce the viscosity of the polymer, thereby making it easier to handle. The monomers are dissolved in a hydrocarbon solvent and this 'mixed-feed' stream is fed to the reactor. Monomers and the solvent can also be fed to the reactor via separate inlets. Catalyst and activator are then introduced into the reactor via an injection port. The activation of the catalyst may be conducted outside the reactor and the activated catalyst complex then introduced into the reactor. In another preferred method, the catalyst components may be injected separately into the reactor, in which case, the activated complex is formed in-situ in the reactor. In certain instances, it may be preferable to inject the catalyst into the mixed feed stream prior to entering the reactor.

In another configuration, the copolymer is made in slurry reactors. The product and/or the catalyst may be present in concentrations that exceed their solubility in the solvent/s used. The insoluble components of these species then form a slurry in the carrier fluid.

In yet another configuration, the slurry reactor is used to influence the monomer concentration in the proximity of the growing chains, thereby influencing the morphology of the copolymer.

In another embodiment, the copolymer is produced in a single plug flow reactor. The catalyst is then deactivated by introducing polar materials, such as water, alcohols, or amines, prior to further downstream purification. The polymeric product that is made is then separated from the carrying medium or solvent by several methods that are known and commonly practiced in industry. In certain methods, the polymer in solution is separated into a polymer-rich or heavy phase and a polymer-poor or lean phase. The pressure and temperature in the separator is adjusted to enhance enrichment of the polymer preferentially in the rich phase. The lighter phase which has very little polymer in it, floats to the top and is removed. The rich phase is then further concentrated by flash evaporation of the solvent before it is fed into a devolatilizing mixer or extruder. A cross-head extruder is mounted at the exit of the devolatizer to further squeeze the polymer through a die plate. In one embodiment of the invention, the polymer is directly extruded through a die plate and pelletized as it leaves the devolatizer. The polymer is cut into little pellets using an under-water pelletizer. In an embodiment, the polymer may be pelletized by a strand cutter or other pelletizers known in the industry. The pellets are conveyed to a spin dryer to remove the water. The pellets then make their way into a fluidized bed dryer to remove moisture and other volatile components. The dry product is then packaged for sale.

Useful Articles

Preferred compositions herein are particularly useful for film applications.

The film can be a mono layer or multi-layer film. In an embodiment, the film comprises at least one layer, whether the only layer of the mono-layer film or a layer of a multi-layer film, comprising of from about 5 wt % to about 95 wt % of the polymer composition based on the total weight of the film layer. In an embodiment, that film layer has a thickness of about 1 µm to about 2,000 µm; about 5 µm to about 150 µm; and about 10 µm to about 100 µm; and about 20 µm to about 90 µm; and about 15 µm to about 75 µm. If part of a multi-layer film structure, the film layer makes up at least 5% of the total film thickness, or at least 10%, or at least 15%, or at least 17%, or at least 20%, or at least 50% of the total film thickness.

The films can be formed by any number of well-known lamination, extrusion or coextrusion techniques. Any of the blown, tentered or cast film techniques commonly used is suitable. For example, a resin composition can be extruded in a molten state through a flat die and then cooled to form a film, in a cast film process. Alternatively, the composition can be extruded in a molten state through an annular die and then blown and cooled to form a tubular, blown film, which can then be used to make sacks or slit and unfolded to form a flat film.

Films with the polymer composition of the invention are expected to possess an excellent balance of mechanical properties, toughness, sealability and cling/adhesive properties. The films can also be used for shrink films and form fill and seal applications requiring abuse resistance. The films also possess good softness/feel and optical/clarity properties useful for food packaging at any temperature.

Specific applications include trash bags, adult care items, agricultural films, aluminum foil laminates, aluminum laminates, asphalt films, auto panel films, bacon packaging, bag-in-box liquid packaging applications, bakery goods, banana film, batch inclusion bags, bathroom tissue overwrap, biaxially oriented films, biaxially oriented polypropylene (BOPP) films, biscuits packages, boutique bags, bread bags, bubble wrap, building film, cake mix packaging, can liners, candy wrap, cardboard liquid packaging, carpet film, carry-out sacks, cement packaging, cereal liners, cheese packaging, chemical packaging, clarity films, coffee packaging, coin bags, collation shrink films, confectionary packaging, construction sheeting, construction film, consumer goods, consumer trash bags, continuous wrap, convenience packaging, cosmetics packaging, counter bags, cover film, cup/cutlery overwrap, deli and bakery wrap, detergent packaging, diaper backsheet, disposables (diapers, sanitary, etc.), dry food packaging, dry grains, dunnage bags, fertilizer, fish & seafood packaging, food packaging, foundation film, freeze-dried products, freezer films, frozen food, fruit juice packaging, furniture bags, garden sacks, garment bags, geomembrane liners, gloves, gravel bags, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware packaging, industrial liner, industrial trash bags, industrial spare parts packaging, in store self-service bags, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat packaging, medical products, medical draping, medium duty bags, merchandise bags, metallized laminates, military hardware packaging, milk bags, milk powder packaging, modified atmosphere packaging, mulch film, multi-wall sack liner, newspaper bags, nose tissue overwrap, olive oil packaging, packaging of beans, packaging of cementations products such as grout, packaging of dry and sharp products, pallet shrink film, pancake batter bags, paper handkerchief overwrap, paper laminates, pasta overwrap, pelletized polymer, perfume packaging, personal care packaging, pesticides packaging, pharmaceuticals packaging, pigment packaging, pizza packaging, polyamide laminates, polyester laminates, potato product packaging, potting soil bags, pouches, poultry packaging, pre-formed pouches, produce bags, produce packaging, rack and counter film, ready-made food packaging, ready meal packaging, retortable product packaging, films for the rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil bags, soup packaging, spice packaging, stand up pouches, storage bags, stretch films, stretch hooders, stretch wrap, supermarket bags, surgical garb, takeout food bags, textile films, refuse bags, thermoformed containers, thin films, tissue overwrap, tobacco packaging, tomato packaging, ketchup packaging, trash bags, t-shirt bags, vacuum skin packaging, vegetable packaging, vertical form-fill-and-seal (FFS) packaging, horizontal FFS packaging, tubular FFS packaging, and water bottle packaging.

In addition to films, the blends described herein will find utility in other applications like, but not limited to extrusion coating, injection molding, rotomolding, and blow molding applications.

Physical properties of the film can vary from those of the polymer composition, depending on the film forming techniques used. Certain unique properties of the films are described in more detail below.

EXAMPLES

In the Examples, E-1 through E-5 were inventive metallocene-catalyzed ethylene-propylene polymer prepared in a single reactor. The catalyst used for preparing all of the inventive polymers was 1,1'-bis(4-triethylsilylphenyl)methylene-(cyclopentadienyl)(2,7-di-tertiary-butyl-9-fluorenyl) hafnium dimethyl and the activator was dimethyl-aniliniumtetrakis(pentafluorophenyl)borate. E-1 through E-5 were polymerized by the process described herein. Copolymerizations were carried out in a single-phase, liquid-filled, stirred tank reactor with continuous flow of feeds to the system and continuous withdrawal of products under equilibrium conditions. All polymerizations were done in a solvent comprising predominantly $C_6$ alkanes, referred to generally as hexane solvent, using soluble metallocene catalysts and discrete, non-coordinating borate anion as co-catalysts. A homogeneous dilute solution of tri-n-octyl aluminum in hexane was used as a scavenger in concentrations appropriate to maintain reaction. Hydrogen, was added, if necessary, to control molecular weight. The hexane solvent was purified over beds of 3 A mole sieves and basic alumina. All feeds were pumped into the reactors by metering pumps, except for the ethylene, which flowed as a gas through a mass flow meter/controller. Reactor temperature was controlled adiabatically by controlled chilling of the feeds and using the heat of polymerization to heat the reactor. The reactors were maintained at a pressure in excess of the vapor pressure of the reactant mixture to keep the reactants in the liquid phase. In this manner the reactors were operated liquid full in a homogeneous single phase. Ethylene and propylene feeds were combined into one stream and then mixed with a pre-chilled hexane stream. A hexane solution of a tri-n-octyl aluminum scavenger was added to the combined solvent and monomer stream just before it entered the reactor to further reduce the concentration of any catalyst poisons. A mixture of the catalyst components in solvent was pumped separately to the reactor and entered through a separate port. The reaction mixture was stirred aggressively using a magna-drive system with three directionally opposed tilt paddle stirrers set to about 750 rpm to provide thorough mixing over a broad range of solution viscosities. Flow rates were set to maintain an average residence time in the reactor of about 10 minutes.

On exiting the reactor, the copolymer mixture was subjected to quenching, a series of concentration steps, heat and vacuum stripping and pelletization, the general conditions of which are described in International Patent Publication WO 99/45041, incorporated herein by reference in its entirety. Properties of E-1 through E-5 are included below in Table 1 and were measured according to the methods described herein.

TABLE 1

Ethylene-Propylene Copolymer Properties

| | E-1 | E-2 | E-3 | E-4 | E-5 |
|---|---|---|---|---|---|
| Ethylene Content, wt % (NMR) | 76.5 | 81.0 | 81.7 | 82.5 | 82.3 |
| $C_4$-$C_{20}$ a-olefin Content, wt % | 0 | 0 | 0 | 0 | 0 |
| Melt Index, g/10 min | 0.18 | 0.08 | 0.17 | 0.23 | 0.11 |
| Melt Temperature, ° C. | 50 | 75 | 71 | 72 | 75 |
| ΔHf, J/g | 33 | 61 | 61 | 61 | 67 |
| Mw/Mn (Mw calculated by MALLS, Mn by DRI) | 2.0 | 1.7 | 2.0 | 1.8 | 2.1 |
| Branching Index | 0.995 | 0.957 | 0.906 | 0.923 | 0.931 |
| Reactivity Ratio | | 0.94 | 0.73 | 0.81 | 0.83 |
| Proportion of Inversely 2, 1 inserted propylene (estimated), wt % | 0 | 0 | 0 | 0 | 0 |

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A polymer comprising greater than or equal to about 70 wt % units derived from ethylene, less than or equal to about 30 wt % units derived from propylene, and less than about 5 wt % of units derived from $C_4$-$C_{20}$ alpha-olefins, and having the following properties:
   a. crystallinity derived from ethylene;
   b. a heat of fusion of about 20 to about 85 J/g;
   c. a polydispersity index (Mw/Mn) of less than about 2.5;
   d. a reactivity ratio of about 0.5 to about 1.5;
   e. a proportion of inversely inserted propylene units based on 2, 1 insertion of propylene monomer in all propylene insertions, as measured by $^{13}C$ NMR of less than 0.5 wt %; and
   f. a branching index greater than about 0.5.

2. The polymer of claim 1, having a melt temperature of less than about 85° C.

3. The polymer of claim 1, having a melt index (measured at 2.16 kg at 190° C.) of about 0.01 to about 5 g/10 min.

4. The polymer of claim 1, comprising from about 77 wt % to about 85 wt % units derived from ethylene.

5. The polymer of claim 1, wherein the polymer is prepared using a metallocene catalyst.

6. The polymer of claim 1, wherein the polymer is substantially free of units derived from diene.

7. The polymer of claim 1, wherein the polymer is in the form of a pellet.

8. An article comprising the polymer of claim 1, wherein the polymer composition is present in the article in the amount of about 10 wt % to about 70 wt %.

9. The article of claim 8, wherein the article is a multilayer film or monolayer film.

10. The article of claim 8, wherein the article is a blown film.

11. A process for forming a polymer, comprising the steps of:
  (a) polymerizing ethylene, propylene, and optionally $C_4$-$C_{20}$ alpha-olefins to form a polymer; and
  (b) recovering the polymer, wherein the polymer has:
    a. crystallinity derived from ethylene;
    b. greater than or equal to about 70 wt % units derived from ethylene, less than or equal to about 30 wt % units derived from propylene, and less than about 5 wt % of units derived from;
    c. a heat of fusion of about 20 to about 85 J/g;
    d. a polydispersity index (Mw/Mn) of less than about 2.5;
    e. a reactivity ratio of about 0.5 to about 1.5;
    f. a proportion of inversely inserted propylene units based on 2, 1 insertion of propylene monomer in all propylene insertions, as measured by $^{13}C$ NMR of less than 0.5 wt %; and
    g. a branching index greater than about 0.5.

12. The process of claim 11, conducted in a solution process.

* * * * *